(12) United States Patent
Tengroth et al.

(10) Patent No.: US 6,230,689 B1
(45) Date of Patent: May 15, 2001

(54) FOUR-STROKE DIESEL ENGINE WITH CATALYTIC CONVERTER

(75) Inventors: Stellan Tengroth, Torslanda; Bengt Larsson, Västra Frölunda, both of (SE)

(73) Assignee: Volvo Lastvagnar AB, Gothenburg (SE)

( * ) Notice: Subject to any disclaimer, the term of this patent is extended or adjusted under 35 U.S.C. 154(b) by 0 days.

(21) Appl. No.: 09/381,171

(22) PCT Filed: Mar. 16, 1998

(86) PCT No.: PCT/SE98/00474

§ 371 Date: Jan. 28, 2000

§ 102(e) Date: Jan. 28, 2000

(87) PCT Pub. No.: WO98/41753

PCT Pub. Date: Sep. 24, 1998

(30) Foreign Application Priority Data

Mar. 17, 1997 (SE) .................................................. 9700967

(51) Int. Cl.⁷ .................................................. F02M 37/04
(52) U.S. Cl. .................................................. 123/508; 60/274
(58) Field of Search .................................. 123/508, 299, 123/300; 60/274, 285, 286, 301, 302; 422/170

(56) References Cited

U.S. PATENT DOCUMENTS

| 5,094,215 | * | 3/1992 | Gustafson | 123/500 |
| 5,787,708 | * | 8/1998 | Lane et al. | 60/301 |
| 5,826,425 | * | 10/1998 | Sebastiano et al. | 60/274 |
| 5,956,942 | * | 9/1999 | Sebastiano et al. | 60/274 |
| 5,986,871 | * | 11/1999 | Forck et al. | 361/160 |
| 6,016,653 | * | 1/2000 | Glassey et al. | 60/274 |

FOREIGN PATENT DOCUMENTS 0 621 400    10/1994 (EP) .

\* cited by examiner

*Primary Examiner*—Noah P. Kamen
*Assistant Examiner*—Mahmoud M Gimie
(74) *Attorney, Agent, or Firm*—Young & Thompson

(57) ABSTRACT

Four-stroke diesel engine with unit injectors and a catalytic converter in the engine exhaust system for catalytic reduction of nitrogen oxides in the exhaust, the unit injectors have pump pistons, each driven by an individual cam element with a cam curve, which has a first cam ridge effecting injection of fuel during the ordinary injection phase of the engine, and a second cam ridge which achieves so-called post-injection in the engine combustion chamber during the exhaust phase of the engine, for supplying vaporized fuel to the catalytic converter.

12 Claims, 3 Drawing Sheets

FOUR-STROKE DIESEL ENGINE WITH CATALYTIC CONVERTER

BACKGROUND OF THE INVENTION

The present invention relates to a four-stroke internal combustion engine comprising one or more cylinders each having a combustion chamber, a fuel injector opening into each cylinder room, a fuel pump device for feeding fuel to the respective injector, an exhaust line leading from the respective combustion chamber and opening into a catalytic converter device for catalytic reduction of $NO_x$ in the exhaust, and means for supplying fuel to the catalytic converter device.

DESCRIPTION OF THE RELATED ART

It is known to use so-called DENOX catalytic converters for catalytic reduction of nitrogen oxides in diesel engine exhaust. It is also a known fact that such catalytic converters have a relatively low efficiency and a narrow temperature range within which they function and that addition of hydrocarbons can increase the efficiency and broaden the temperature range. This can be effected by adding extra diesel fuel in such a manner that it reaches the catalytic converter in vapour form. Where the fuel is supplied is of no consequence as long as no combustion occurs prior to the catalytic converter.

Different methods and systems for supplying fuel to the catalytic converter are known. One method uses a separate fuel system which injects fuel into the exhaust line prior to the catalytic converter. In another method, which is known by WO96/03572 for example, the ordinary fuel injector of the engine is to inject, after the ordinary fuel injection phase, a small amount of fuel directly into one or more of the engine combustion chambers during the exhaust phase, so that the fuel in vapour form is transported with the exhaust to the catalytic converter. For this purpose a fuel injection system is used in the engine which is known as "common rail" and comprises a high-pressure vessel which is kept continually under high pressure with the aid of a high-pressure pump between the vehicle fuel tank and the high-pressure vessel and which communicates with all of the injectors via electronically controlled valves cooperating with the respective injectors. Since the system is under constant pressure, fuel can be theoretically injected at an arbitrary number of times any time during the work cycle of the engine. The control of the injection both at the ordinary injection phase and at the extra post-injection phase is achieved with the aid of a control unit (control computer), which opens and closes the valves depending on various engine data fed into the control unit. With a common rail fuel injection system, the post-injection phase can be freely selected since the system does not have a varying fuel pressure cycle to take into account, as would be the case in usually occurring cam shaft-driven fuel injection systems.

SUMMARY OF THE INVENTION

The purpose of the present invention is to achieve, in an internal combustion engine of the type described by way of introduction, the above mentioned post-injection without using the known common rail system or any other separate dosage system.

This is achieved according to the invention by virtue of the fact that the fuel pump device comprises individual fuel pump means for each injector, and a cam shaft driven by the engine crankshaft, and having a cam element for each fuel pump means, said cam element having a first cam ridge, which is arranged to effect, once per work cycle, a first pump stroke in the associated fuel pump means, and at least a second cam ridge which is arranged to effect, once per work cycle, a second pump stroke in the associated fuel pump means, a predetermined number of crankshaft degrees after the first pump stroke, and that an electronic control unit is arranged to control a by-pass valve, cooperating with each injector, to regulate the amount of injection and the time during the respective pump stroke, depending on various control parameters fed into the control unit.

The time interval for the second injection phase is in this case determined by the geometric position of the second cam ridge relative to the first while the exact injection time and injection amount from each injector can be varied depending on the operational state of the engine with the aid of by-pass valves which are also used to determine if any injection should occur at all, i.e. the amount can be controlled to zero.

In one embodiment of the engine according to the invention with at least two cylinders, a cam element has a second cam ridge with a cam curve which achieves a second pump stroke a certain number of crankshaft degrees from the first pump stroke, and a second cam element has a second cam ridge with a cam curve which achieves a second pump stroke at another predetermined number of crankshaft degrees after the first pump stroke. The control unit is in this case arranged to control the by-pass valves of the injector depending on the engine load, so that extra fuel to the catalytic converter is injected through an injector having an earlier post-injection when the engine load is low (partial load) and through an injector with a later post-injection when the load is high (full load). In this manner a system is achieved which in practice provides essentially the same freedom as regards the injection time as a common rail system.

BRIEF DESCRIPTION OF THE DRAWINGS

The invention will be described in more detail below with reference to examples shown in the accompanying drawings, where.

DESCRIPTION OF THE PREFERRED EMBODIMENTS

Figure 1:
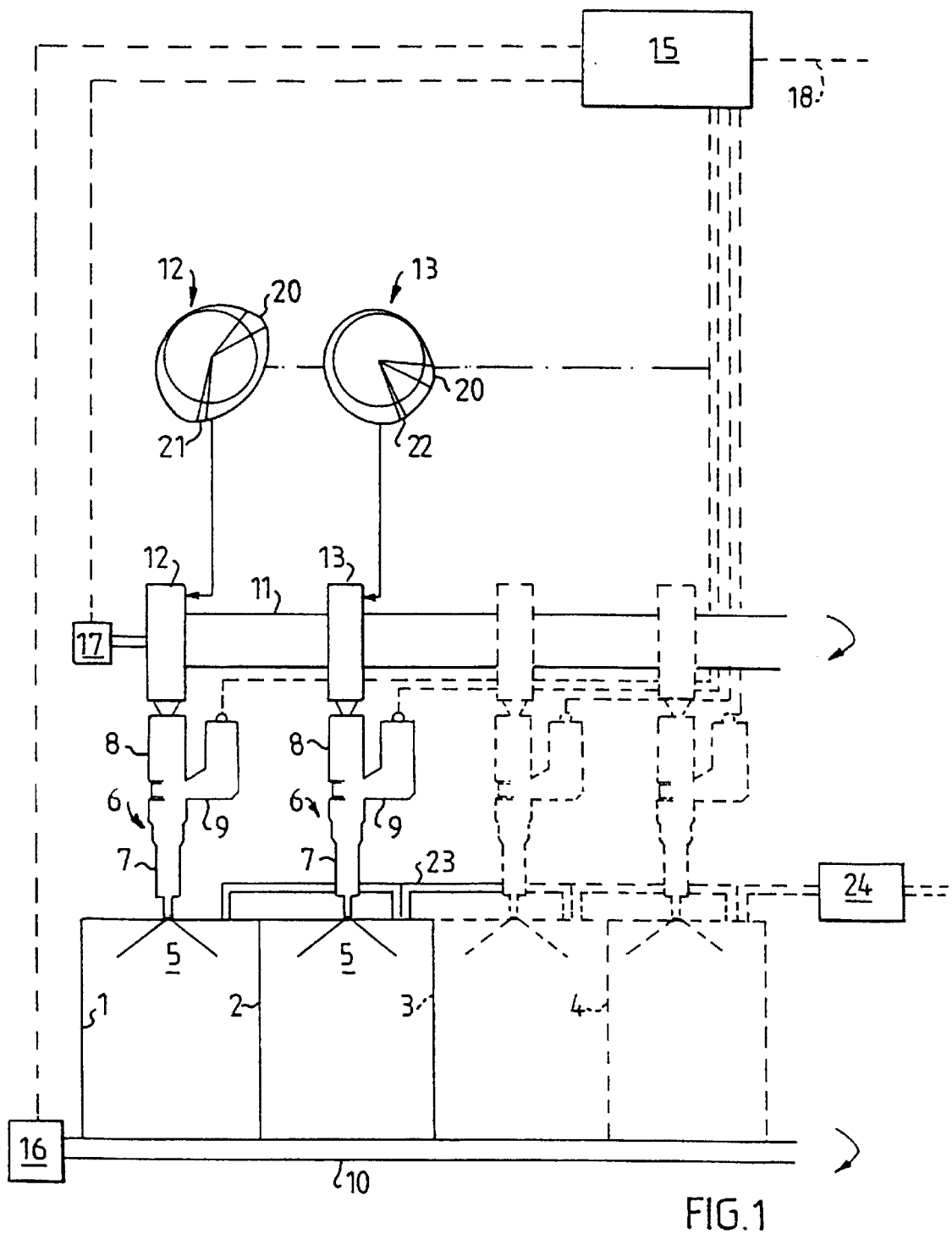
FIG. 1 shows a schematic representation of one half of a multicylinder straight engine.
Figure 2:
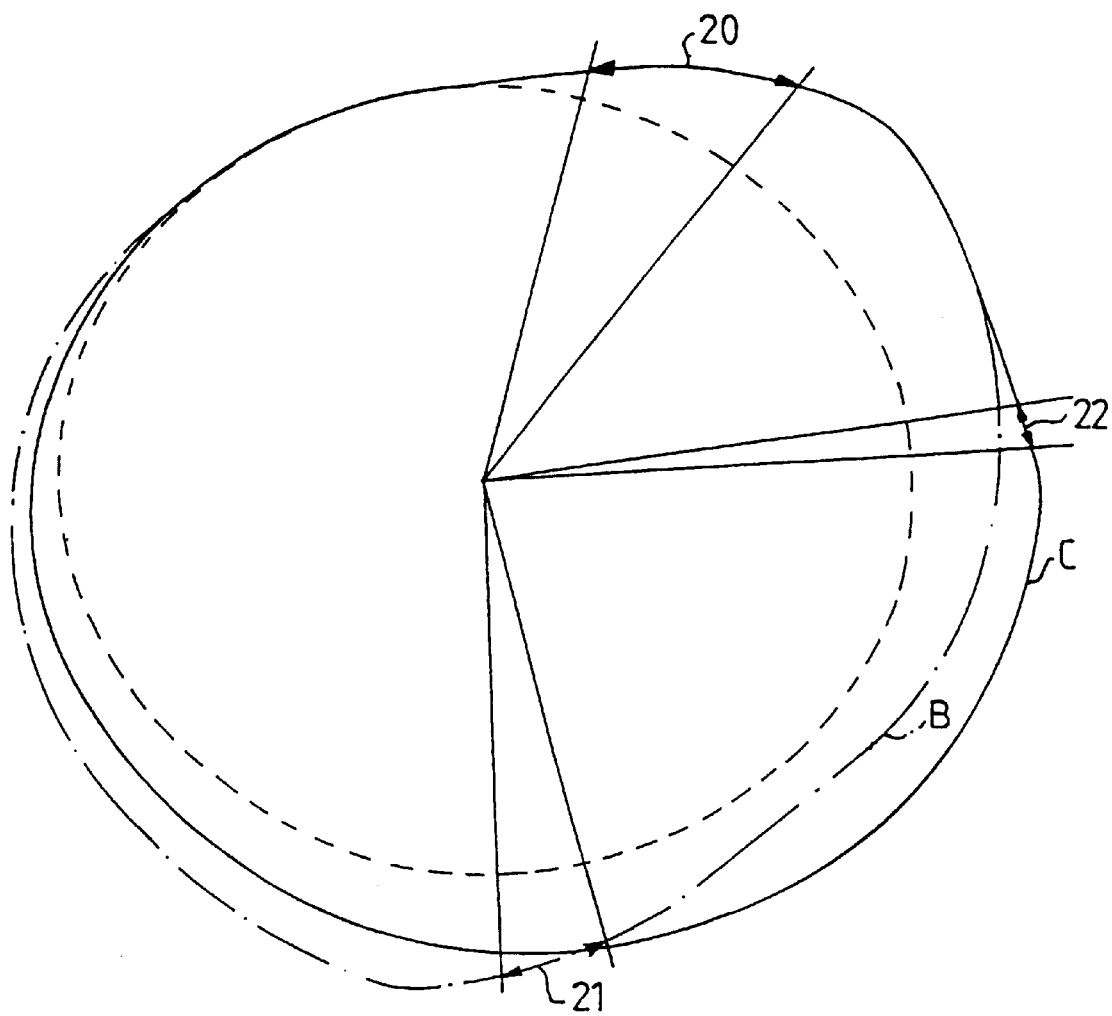
FIG. 2 shows schematically the cam profiles in FIG. 1 on a larger scale.

In FIG. 1, 1 and 2 designate two cylinders in a four-stroke diesel engine. The dashed lines indicate additional cylinders 3 and 4, which can be the third and fourth cylinders in a four-cylinder engine.

Into the combustion chamber 5 in each cylinder there opens a fuel injector, generally designated 6, which comprises an injector portion 7 and a pump portion 8 with an associated electronically controlled by-pass valve 9. A fuel injector 6 of this type is usually called an electronic unit injector since the pump 8 and the injector 7 form a unit. The pump 8 is a piston pump and the piston movement is achieved in a known manner with the aid of a cam shaft 11 driven by the engine crankshaft 10, the cam shaft having a cam element 12 or 13 for each injector 6.

In a conventional engine with a unit injector 6, all of the cam elements have identical cam curves with one lift ridge which achieves the pump piston stroke. The lift ridges are displaced relative to each other in accordance with the ignition sequence and their positions determine the possible injection interval in the respective cylinder, while the actual fuel amount and time is regulated by the by-pass valves 9, which are electromagnetically operated and are controlled by an electronic control unit 15. A sensor 16 and a sensor 17 provide signals to the control unit 15 which represent the rotational speed of the crankshaft 10 and the angular position of the cam shaft 11. Furthermore, signals 18 are fed into the control unit 15 representing the accelerator position. Additional sensors, connected to the control unit 15 which are irrelevant to elucidating the invention, have been left out.

The cam elements 12 and 13 have identical first lift ridges 20, which achieve the ordinary pump stroke for injecting fuel into the combustion chamber during the end of the compression stroke and the beginning of the expansion stroke. According to the invention, the cam elements 12 and 13 are made so that second lift ridges are formed, which are designated 21 and 22, respectively, in the example shown. As can be been in FIGS. 1 and 2, the lift ridge 21 of the cam element 12 is located at a greater angular distance from the ordinary lift ridge 20 than is the lift ridge 22 of the cam element 13.

With the aid of the lift ridges 21 and 22, a second shorter pump stroke after the first pump stroke is provided for injecting a small amount of fuel into the combustion chamber at a time before the cylinder exhaust valve is closed. The injection time is selected so that fuel is vaporized but is not ignited in the cylinder, which means that the vaporized fuel will be transported with the exhaust through the exhaust line 23 of the engine to the catalytic converter 24.

Figure 3:
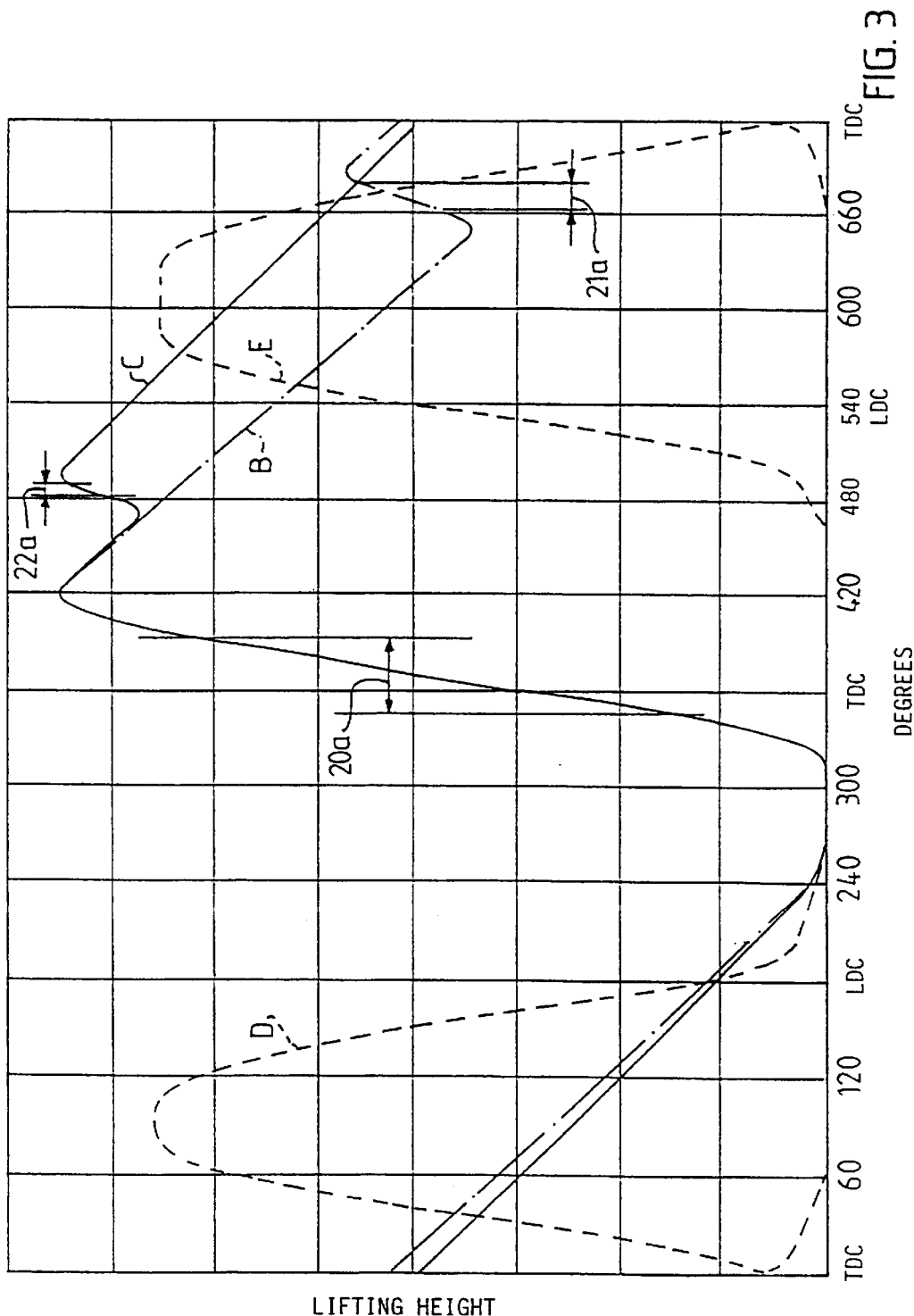
FIG. 3 shows a diagram of the lift curves of the fuel injection pump for the cam profiles shown in FIG. 2 together with the lift curves of the intake and exhaust valves.

In FIG. 3, the curve B illustrates the pump stroke caused by the lift ridge 21, and the curve C illustrates the pump stroke caused by the lift ridge 22. In FIG. 3, the lift curves D and E, respectively, of the intake valve and the exhaust valve, respectively, are shown. As can be seen from the diagram in FIG. 3, the lift ridge 21 provides injection at a later point in time than the lift ridge 22. The pump strokes in the diagram are designated 20a, 21a and 22a.

With the aid of the signals fed into the control unit 15, the control unit calculates when the injection of the extra amount of fuel should take place and selects activation of the by-pass valve belonging to the cam element 12 or 13. The cam profiles providing the various lift curves B and C have been given the corresponding designations B and C in FIG. 2.

A four-cylinder engine of the design described has an additional cam element corresponding to the cam element 12 and has a a corresponding cam element 13, while a six-cylinder engine has two additional cam elements corresponding to the cam element 12 and two additional cam elements corresponding to cam element 13. Each of the cam elements can be disposed to achieve an extra pump stroke of the associated injection pump which provides maximum required fuel amount to the catalytic converter. In such a case, the control unit 15 can be arranged to control the injection so that it alternates between the different injectors to provide for even wear. This design also makes possible exact dosage of the fuel amount, since the effect of the relatively slow reaction of the by-pass valves will be small. In another embodiment, the can elements can be disposed to provide an extra pump stroke which gives half (in a four-cylinder engine) or a third (in a six-cylinder engine) of the maximum required fuel amount. Here, the control unit 15 is arranged to control the injection of fuel through two (four-cylinder engine) or three (six-cylinder engine) injectors during one work cycle.

Alternating between the injectors can be done in a number of different ways. With a six-cylinder engine and two groups of three identical cam profiles, the alternation between different injectors can be done as follows:

720° between extra injections (the same injector for each cycle)

480° between extra injections (different injectors)

960° between extra injections (different injectors)

generally a multiple of 240° between extra injections.

It is, of course, possible within the scope of the invention to make the cam elements so that more than two different injection times for post-injection are obtained. A four-cylinder engine can have four and a six-cylinder engine six different injection times to make possible still better adaption of the fuel injection timing to the load of the engine. Here, each cam element must be made to provide a pump stroke which gives the maximum required fuel amount to the catalytic converter. It is also conceivable to have a six-cylinder engine with three different post-injection times, where the cam elements are made so that a pump stroke provides half of the maximum required fuel amount and so that the control unit 15 during one work cycle of the engine divides the injection between two injectors.

The invention has been described above with reference to an example of a multicylinder engine with so-called unit injectors, but it can also be used in a single-cylinder engine and in an engine with so-called unit pump injectors, i.e. an engine with a fuel system where the injectors and the pump device are separate but where each injector has its own pump piston driven by a cam element. Theoretically, the pump can be a straight pump, a radial piston pump or an axial piston pump. Furthermore, it is also possible within the scope of the basic idea of the invention to arrange more than one extra cam ridge for the extra injection.

What is claimed is:

1. Four-stroke internal combustion engine comprising:

two or more cylinders (1,2,3) each having a combustion chamber (5);

a fuel injector (7) opening into each cylinder room;

a fuel pump device (8) for feeding fuel to the respective injector;

an exhaust line (23) leading from the respective combustion chamber and opening into a catalytic converter device (24) for catalytic reduction of $NO_x$ in the exhaust; a means for supplying fuel to the catalytic converter device, the fuel pump device comprising individual fuel pump means (8) for each injector (7), and a cam shaft (11) driven by the engine crankshaft (10), and having a cam element (12,13) for each fuel pump means, said cam element having a first cam ridge (20) which is arranged to effect, once per work cycle, a first pump stroke in the associated fuel pump means, and at least a second cam ridge (21,22) which is arranged to effect, once per work cycle, a second pump stroke in the associated fuel pump means a predetermined number of crankshaft degrees after the first pump stroke; and an electronic control unit (15) arranged to control a by-pass valve (9) cooperating with each injector, to regulate the amount of injection and the time during the respective pump stroke, depending on various control parameters fed into the control unit, wherein the second cam ridge (21,22) on the respective cam element (12,13) has a cam curve (B,C) which is made to effect a second pump stroke, which makes possible injection of the maximum required fuel amount from an injector (7), and the control unit (15) is arranged to control the respective by-pass valve, so that fuel is injected alternatingly by one and the other injector.

2. Internal combustion engine according to claim 1, characterized in that a cam element (12) has a second cam ridge (21) with a cam curve (B), which achieves a second pump stroke a predetermined number of crankshaft degrees after the first pump stroke, and that a second cam element (13) has a second cam ridge (22) with a cam curve (C) which achieves a second pump stroke at another predetermined number of crankshaft degrees after the first pump stroke, and that the control unit (15) is arranged to control the by-pass valves (9) of the injectors depending on the engine load, so that the injection caused by the second pump stroke occurs at an earlier point in time at low load than at high load.

3. Internal combustion engine according to claim 2 with at least four cylinders, characterized in that said second cam ridges in all cam elements are made with different cam curves.

4. Internal combustion engine according to claim 2, characterized in that the cam elements are grouped in at least two groups, where the cam curves of said second cam ridges are identical within the respective group, but different between the groups.

5. Internal combustion engine according to claim 1, characterized in that each injector (7) with associated pump means (8) forms an integrated unit, a so-called unit injector (6) arranged in the cylinder head of the engine.

6. Internal combustion engine according to claim 1, characterized in that each injector communicates with a fuel pump means which is separate from the injector.

7. Four-stroke internal combustion engine comprising:

two or more cylinders (1,2,3) each having a combustion chamber (5);

a fuel injector (7) opening into each cylinder room;

a fuel pump device (8) for feeding fuel to the respective injector;

an exhaust line (23) leading from the respective combustion chamber and opening into a catalytic converter device (24) for catalytic reduction of $NO_x$ in the exhaust; a means for supplying fuel to the catalytic converter device, the fuel pump device comprising individual fuel pump means (8) for each injector (7), and a cam shaft (11) driven by the engine crankshaft (10), and having a cam element (12,13) for each fuel pump means, said cam element having a first cam ridge (20) which is arranged to effect, once per work cycle, a first pump stroke in the associated fuel pump means, and at least a second cam ridge (21,22) which is arranged to effect, once per work cycle, a second pump stroke in the associated fuel pump means a predetermined number of crankshaft degrees after the first pump stroke; and an electronic control unit (15) arranged to control a by-pass valve (9) cooperating with each injector, to regulate the amount of injection and the time during the respective pump stroke, depending on various control parameters fed into the control unit, wherein the second cam ridge (21,22) on the respective cam element (12,13) has a cam curve (B,C) which is made to effect a second pump stroke, which makes possible injection of an amount of fuel which is less than the maximum required fuel amount, and the control unit (15) is arranged, depending on the required fuel amount, to control the by-pass valves for injecting through more than one injector (7) during a work cycle.

8. Internal combustion engine according to claim 7, characterized in that a cam element (12) has a second cam ridge (21) with a cam curve (2), which achieves a second pump stroke a predetermined number of crankshaft degrees after the first pump stroke, and that a second cam element (13) has a second cam ridge (22) with a cam curve (C) which achieves a second pump stroke at another predetermined number of crankshaft degrees after the first pump stroke, and that the control unit (15) is arranged to control the by-pass valves (9) of the injectors depending on the engine load, so that the injection caused by the second pump stroke occurs at an earlier point in time at low load than at high load.

9. Internal combustion engine according to claim 7 with at least four cylinders, characterized in that said second cam ridges in all cam elements are made with different cam curves.

10. Internal combustion engine according to claim 7, characterized in that the cam elements are grouped in at least two groups, where the cam curves of said second cam ridges are identical within the respective group, but different between the groups.

11. Internal combustion engine according to claim 7, characterized in that each injector (7) with associated pump means (8) forms an integrated unit, a so-called unit injector (6) arranged in the cylinder head of the engine.

12. Internal combustion engine according to claim 7, characterized in that each injector communicates with a fuel pump means which is separate from the injector.

* * * * *